2,884,435

AMINOARYL ISOCYANATES AND THEIR MANUFACTURE

James Junkichi Tazuma, Trenton, N.J., assignor to Food Machinery and Chemical Corporation, New York, N.Y., a corporation of Delaware No Drawing. Application February 25, 1957
Serial No. 641,865

2 Claims. (Cl. 260—453)

This invention relates to a novel and unusual type of isocyanate useful in the preparation of valuable plastics, resins, and other compositions.

It is an object of this invention to provide certain novel aminoisocyanates and a method of preparing them.

As is well known, the isocyanates are an extremely reactive class of compounds; some of their more important uses involve their reactions with so-called active-hydrogen compounds including alcohols, phenols, amines, and carboxylic acids to form urethanes, substituted ureas, and substituted amides.

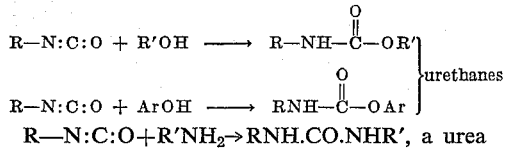

$R-N{:}C{:}O + R'NH_2 \rightarrow RNH.CO.NHR'$, a urea $R-N{:}C{:}O + R'CO_2H \rightarrow CO_2 + RNH.CO.R'$, an amide This tendency of the isocyanate radical to react with active-hydrogen compounds is so great that, so far as I am aware, it had not been thought possible, before my invention, to prepare a polyfunctional, monomeric compound which contains both an isocyanate radical and a primary amino radical.

Isocyanates are ordinarily prepared by phosgenation of the corresponding primary amines.

(1)   $2RHN_2 + COCl_2 \rightarrow RNHCOCl + RNH_2.HCl$ (2)   $RNH_2.HCl + COCl_2 \rightarrow RNHCOCl + 2HCl$ (3)   $RNHCOCl \rightarrow RNCO + HCl$ Reaction 1 is a relatively rapid reaction and proceeds well even at temperatures between 0 and 60° C.; Reaction 2 is considerably slower and requires ordinarily a temperature of at least about 60° C. to proceed at a satisfactory rate. Reaction 3 ordinarily requires a temperature of at least about 100° C. to proceed at a reasonable rate. It will be seen that Reactions 2 and 3 both involve the formation of HCl as a by-product. These are equilibrium reactions, and go to completion only if HCl is removed from the system. Accordingly, conditions tending to result in the reduction of HCl concentration in the reaction zone favor Reactions 2 and 3. Such conditions are elevated temperature, which reduces the solubility of HCl in the solvent medium, and passing a stream of gas through the reaction zone to sweep out the HCl. The most convenient sweeping gas to employ is, of course, phosgene itself, since it is needed as a reactant and also serves, in small excess, to sweep out HCl. When polyamines such as m-phenylene diamine, m-tolylene diamine, hexamethylene diamine, etc., are subjected to phosgenation, the reaction proceeds so that the amino groups are converted to isocyanate groups. Thus, heretofore it has been impossible to isolate a compound having both amino and isocyanate groups.

Surprisingly, I have found that when certain highly-halogenated polyamines are subjected to phosgenation, there is formed a substantial amount of aminoisocyanate.

The term isocyanate when used in this specification and the appended claims include mono, di and polyisocyanates unless stated to the contrary.

According to my invention my novel aminoaryl isocyanates are prepared by reaction of a highly halogenated polyamine with phosgene in the presence of from five to 50, preferably about 20 times its weight of an inert solvent.

Suitable inert solvents are aromatic hydrocarbons such as benzene, toluene, xylenes, and methyl naphthalenes, aliphatic hydrocarbons such as heptanes, octanes, nonanes, petroleum ethers, naphthas, and kerosenes, halogenated aromatic solvents such as chlorobenzene, chlorotoluenes, chloroxylenes, o-dichlorobenzene, dichlorotoluenes, bromobenzene, and bromotoluene, and halogenated aliphatic solvents such as trichloroethylene, tribromoethylene, and perchloroethylene. Preferred solvents are those which boil between about 75° C. and about 150° C.

The highly halogenated aromatic polyamines which I may convert according to my invention into aminoaryl isocyanates are the aromatic polyamines in which each position ortho to an amino group is substituted by halogen. These include 2,4,6-tribromophenylene - 1,3 - diamine, 2,4,6-trichlorophenylene-1,3-diamine, 2,4,5,6-tetrachlorophenylene-1,3-diamine, 2,4,5,6 - tetrabromophenylene-1,3-diamine, 2,3,5,6-tetrachlorophenylene - 1,4 - diamine, 2,3,5,6-tetrabromophenylene-1,4-diamine, 2,4,6-trichloro-1,3,5-triaminobenzene and 2,4,6-tribromo - 1,3,5-triaminobenzene.

The specific highly halogenated aromatic polyamines named above yield, on phosgenation, 2,4,6-tribromo-3-aminophenyl isocyanate, 2,4,6 - trichloro-3-aminophenyl isocyanate, 2,4,5,6-tetrachloro-3-aminophenyl isocyanate, 2,4,5,6-tetrabromo - 3 - aminophenyl isocyanate, 2,3,5,6-tetrachloro-4-aminophenyl isocyanate, 2,3,5,6 - tetrabromo-4-aminophenyl isocyanate, 2,4,6 - trichloro - 3,5 - diaminophenyl isocyanate, 2,4,6-tribromo - 3,5 - diaminophenyl isocyanate, 2,4,6-trichloro-5-amino-phenylene-1,3-diisocyanate, and 2,4,6-tribromo-5-aminophenylene-1,3-diisocyanate.

The temperature at which the reaction is carried out is generally governed by the boiling point of the solvent chosen. Preferably, however, the temperature is maintained at about 130° C.

A typical member of my novel class of compounds, 3-amino-2,4,6-tribromophenyl isocyanate, may be prepared as follows:

Approximately 1100 grams of chlorobenzene are placed in a 3-liter 3-necked flask enclosed in a heating mantle and fitted with a stirrer, a thermometer, a gas inlet tube, a reflux condenser cooled with solid carbon dioxide, and a dropping funnel. Approximately 770 g. of phosgene is passed into and dissolved in the chlorobenzene, which is maintained at room temperature. A solution of 100 grams of 2,4,6-tribromo-1,3-phenylene diamine in 1100 grams of chlorobenzene (at 80° C.) is then added rapidly through the dropping funnel. The temperature of the reaction mixture is now 50° C., and there is gentle refluxing of phosgene. Heating is commenced, and after six hours of refluxing, the liquid temperature reaches 130° C.; the reaction mixture is filtered to remove a small amount of solids. The filtrate is then evaporated at a reduced pressure of about 44 mm. Hg absolute until most of the chlorobenzene has been distilled off. The pot residue is then extracted with two 300 ml. portions of boiling trichloroethylene. From the first extract is obtained 46.5 grams of crude 3-amino-2,4,6-tribromophenyl isocyanate (M.P. 96–99° C.), and 11 grams of a mixture of this product and 2,4,6-tribromo-1,3-phenylene diisocyanate (M.P. of mixture, 76–78). From the second extract, 5 grams of the crude 3-amino-2,4,6-tribromophenyl isocyanate and 11 grams of the mixture of this compound with 2,4,6-tribromo-1,3-phenylene diisocyanate is obtained. Recrystallization of the crude 3-amino-2,4,6-tribromophenyl isocyanate from boiling trichloroethylene yields 32 grams of purified material in the form of colorless needles melting at 101–102° C., with the following analysis:

| | Found | Calc. for $C_7H_3ON_2Br_3$ |
|---|---|---|
| C | 22.7 | 22.7 |
| H | 0.5 | 0.8 |
| Br | 66.8 | 65.0 |
| Amine Equivalent | 200 | 198 |

This compound is useful as an intermediate in the synthesis of other carbon compounds, particularly in the synthesis of polymers, dyes, medicinals, and insecticides. When heated above its melting point it undergoes polymerization to form a linear polymer with recurring

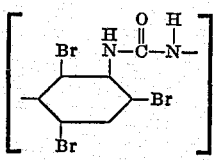

groupings. The monomeric compound may be used as a chain-stopper in the formation of polyurethanes or polyureas and the resulting intermediate polymer may be then further reacted with an aromatic or aliphatic diisocyanate to form a superpolymer. Incorporation of 3-amino-2,4,6-tribromophenyl isocyanate into these superpolymers confers added stability and enhanced flame resistance and improved dielectric properties on the resulting ultimate products.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

That which is claimed as patentably novel is:

1. Aminopolyhalo phenyl isocyanates having in each position ortho to an amino radical and in each position ortho to an isocyanate radical a halogen substituent selected from the group consisting of chlorine and bromine.

2. 3-amino-2,4,6-tribromophenyl isocyanate.

References Cited in the file of this patent

UNITED STATES PATENTS

| | | |
|---|---|---|
| 2,428,843 | Georges et al. | Oct. 14, 1947 |
| 2,625,561 | Werntz | Jan. 13, 1953 |